United States Patent
Spindler et al.

(10) Patent No.: US 7,999,593 B2
(45) Date of Patent: Aug. 16, 2011

(54) ELECTRIC CIRCUIT FOR AND METHOD OF GENERATING A CLOCK SIGNAL

(75) Inventors: Robert Spindler, Graz (AT); Roland Brandl, Eggersdorf Bei Graz (AT); Ewald Bergler, Weiz (AT)

(73) Assignee: NXP B.V., Eindhoven (NL)

( * ) Notice: Subject to any disclaimer, the term of this patent is extended or adjusted under 35 U.S.C. 154(b) by 114 days.

(21) Appl. No.: 12/097,038

(22) PCT Filed: Dec. 6, 2006

(86) PCT No.: PCT/IB2006/054626
§ 371 (c)(1),
(2), (4) Date: Jun. 11, 2008

(87) PCT Pub. No.: WO2007/069138
PCT Pub. Date: Jun. 21, 2007

(65) Prior Publication Data
US 2008/0265946 A1    Oct. 30, 2008

(30) Foreign Application Priority Data

Dec. 12, 2005  (EP) ..................................... 05111954

(51) Int. Cl.
*G06F 1/04* (2006.01)
*H03K 3/00* (2006.01)
(52) U.S. Cl. ......... 327/291; 327/292; 327/293; 327/294
(58) Field of Classification Search .................... 327/291
See application file for complete search history.

(56) References Cited

U.S. PATENT DOCUMENTS

| | | | |
|---|---|---|---|
| 4,890,316 A | 12/1989 | Walsh et al. | |
| 5,793,709 A | 8/1998 | Carley | |
| 6,194,971 B1 * | 2/2001 | Glen et al. | 331/57 |
| 6,388,492 B2 | 5/2002 | Miura et al. | |
| 7,215,165 B2 * | 5/2007 | Yamamoto et al. | 327/156 |
| 2001/0018751 A1 | 8/2001 | Gresham | |
| 2002/0085657 A1 | 7/2002 | Boerstler | |
| 2002/0090045 A1 | 7/2002 | Hendrickson | |
| 2003/0081712 A1 | 5/2003 | Takada | |
| 2003/0132783 A1 * | 7/2003 | Natsume | 327/1 |

FOREIGN PATENT DOCUMENTS

| | | |
|---|---|---|
| EP | 0508232 A2 | 10/1992 |
| EP | 0717329 A2 | 6/1995 |

\* cited by examiner

*Primary Examiner* — Lincoln Donovan
*Assistant Examiner* — John W Poos

(57) ABSTRACT

An electric circuit (30) for generating a clock-sampling signal (CLK) for a sampling device (31) comprises a clock generator (1, 40, 50, 60) for generating a plurality of clock signals (21-24, 51-54, 61-64), a correlation device (L) for correlating a characteristic signal section (LE) of a digital signal (DS) with the plurality of clock signals (21, 22, 23, 24, 51-56, 61-64), and a selecting device (MX) for selecting one of the clock signals (21, 22, 23, 24, 51-55, 61-64) as the clock-sampling signal (CLK) for the sampling device (31) on the basis of the correlation by the correlation device (L). The clock signals (21-24, 51-54, 61-64) have the same cycle duration (T) and are phase-shifted with respect to each other. The sampling device (31) subsequently samples the digital signal (DS) with the clock-sampling signal (CLK).

10 Claims, 4 Drawing Sheets

ELECTRIC CIRCUIT FOR AND METHOD OF GENERATING A CLOCK SIGNAL

FIELD OF THE INVENTION

The invention relates to an electric circuit for generating a clock signal for a sampling device, the electric circuit comprising a clock generator for generating a plurality of clock signals having the same cycle duration and being phase-shifted with respect to each other. The invention further relates to an associated method of generating a clock signal.

BACKGROUND OF THE INVENTION

When transmitting data between a sender and a receiver, the problem generally arises that the internal clock of the receiver has to be synchronized with the internal clock of the sender so as to provide a satisfactory data transmission. Otherwise, the transmitted data is sampled by a sampling device of the receiver at bad points in time, resulting in transmission errors. It should be noted that the stated problem arises for any sender/receiver combination having independent internal clocks, regardless of the physics of the transmission channel. This means that the problem equally arises for transmitting data by use of sound, light, radio waves and any other medium.

To provide satisfactory synchronization and data transmission, a digital input signal is therefore sampled by a sampling device at a sampling frequency which is significantly higher than the frequency of the digital signal. Hence, the receiver comprises a clock generation device, which generates a clock signal with an appropriate frequency. However, generating a clock signal with a relatively high frequency unfortunately results in a relatively high power consumption.

Several methods have been found in the prior art to provide clock signals having such a high frequency. One example is a quartz oscillator. A further example is U.S. Pat. No. 6,388,492 B2, which discloses a clock generation circuit including a multiphase clock generation circuit for generating multiphase clocks of a predetermined frequency, pulse generation circuits for generating a plurality of non-overlap pulses by using at least a part of the multiphase clocks, and a circuit for obtaining an OR of the plurality of non-overlap pulses, thereby generating a clock not having a simple whole multiple ratio relationship with respect to a frequency of the multiphase clocks or a clock having a higher frequency without causing an increase of power consumption and an increase of chip area. Thus, a clock having a frequency which is different from that of the multiphase clocks is generated.

OBJECT AND SUMMARY OF THE INVENTION

It is an object of the invention to provide an electric circuit and a method for generating a clock signal, which requires less energy and retains an appropriate synchronization of a digital signal.

According to the invention, the above object is achieved by an electric circuit for generating a clock signal for the sampling device, the electric circuit comprising: a clock generator for generating a plurality of clock signals, each having the same cycle duration and being phase-shifted with respect to each other, a correlation device for correlating a characteristic signal section of a digital signal with the plurality of clock signals, and a selecting device for selecting one of the clock signals as a clock-sampling signal for a sampling device to sample the digital signal on the basis of the correlation by the correlation device. The clock generator generates the plurality of clock signals each having the same cycle duration but being phase-shifted with respect to each other. Each clock signal preferably has the same phase shift with respect to its preceding and succeeding clock signal. For example, if eight clock signals are used, each clock signal lags its preceding clock signal by 45°. One of the clock signals is to be chosen as the clock-sampling signal, i.e. as the clock signal to clock the sampling device. In order to select the appropriate clock-sampling signal from the plurality of clock signals, the plurality of clock signals is correlated with the digital signal by the correlation device. Specifically, the plurality of clock signals is correlated with a characteristic signal section of the digital signal. A characteristic signal section of the digital signal may be particularly a rising or a falling edge of the digital signal. A characteristic signal section may also be a minimum or a maximum of the digital signal.

One advantage of the electric circuit according to the invention is that a comparably high synchronization accuracy (i.e. a small time or phase error) can be achieved by using a clock signal for the sampling device having a relatively low frequency. Accordingly, the power consumption is relatively low due to the low frequency, which is particularly advantageous when receiving devices must cope with limited power resources. Examples are smart cards and RFID devices. Particularly when using passive devices (without onboard battery), the radio range of a transponder is a function of the power consumption, i.e. the lower the power consumption, the higher the radio range, which is obviously a fundamental feature of a transponder. Accordingly, the invention is particularly advantageous for passive transponders.

Normally, the clock signals are pulsed signals and have characteristic sections, such as a rising or falling edge. Then, the correlation device may be configured to carry out the correlation by determining a time or phase difference between characteristic sections of the plurality of clock signals and the characteristic signal section of the digital signal. In a preferred version of the electric circuit according to the invention, the clock signal with the smallest time or phase difference between its characteristic section and the characteristic signal section is selected as the clock-sampling signal.

The clock generator may comprise an oscillator, which generates a base clock signal, and a signal-processing device for generating the plurality of clock signals on the basis of the base clock signal. The base clock signal may be used as one of the clock signals of the plurality of clock signals. The signal-processing device may be configured to generate the remaining clock signals by appropriately time-delaying the base clock signal. Consequently, the individual clock signals do not have to be generated by first generating a reference clock signal with a smaller cycle duration than the cycle durations of the clock signals and then using a frequency divider. This makes it possible to reduce the power consumption of the circuit, because the generation of a clock signal having a relatively small cycle duration, or a relatively high frequency, can be avoided.

In another limited version of the circuit according to the invention, the clock generator comprises a ring oscillator and at least one time delay device. Here, the total phase shift of 180°, which has to be provided in a feedback loop of an oscillator, is advantageously split into sub-shifts, thus providing phase-shifted signals.

According to the invention, the object is also achieved by means of a method of selecting a clock signal from a plurality of clock signals, the method comprising the steps of: generating a plurality of clock signals, each having the same cycle duration and being phase-shifted with respect to each other; correlating a characteristic signal section of a digital signal with the clock signals; and choosing, from the plurality of clock signals, a clock-sampling signal for a sampling device for sampling the digital signal on the basis of the correlation. The digital signal is sampled by the sampling device. In order to synchronize the sampled digital signal, the sampling device must be clocked with an appropriate clock-sampling signal, which is chosen form the plurality of clock signals. The clock signals have the same cycle durations but are phase-shifted with respect to each other. The digital signal has a characteristic signal section, for instance, a rising or a falling edge. When a digital signal is received by the sampling device, the characteristic section of the digital signal is correlated with the plurality of clock signals. The correlation may be carried out by correlating the characteristic signal section of the digital signal with a characteristic section of the clock signals. A characteristic section of a clock signal may be a rising or a falling edge of the respective clock signal. Subsequently, the clock-sampling signal is chosen on the basis of the correlation.

In a limited version of the method according to the invention, the step of correlating the characteristic signal section of the digital signal with the clock signal is carried out by comparing a time or a phase difference between the characteristic signal sections with a characteristic section of the clock signals. The sampling clock is selected as the clock signal form the plurality of clock signals with the smallest time or phase difference.

The method according to the invention may be used to synchronize the asynchronous digital signal with the clock-sampling signal. The method provides the possibility of achieving the same time resolution as when a clock-sampling signal with a higher frequency is used. However, since the clock signals have a smaller frequency, the method according to the invention will likely result in saving power.

According to the invention, the above object is also achieved by means of a method of selecting a clock signal from a plurality of clock signals, the method comprising the steps of: generating a plurality of clock signals, each having the same cycle duration but being phase-shifted with respect to each other, and having a rising and a falling edge; and choosing, from the plurality of clock signals, the clock signal whose rising or falling edge immediately follows a characteristic signal section of a digital signal as a clock-sampling signal for a sampling device for sampling the digital signal. The clock-sampling signal is used to synchronize the sampling device. Particularly, if each clock signal has the same phase shift with respect to its preceding or succeeding clock signals, a resulting synchronization error will be the same when using a virtual clock-sampling signal with a frequency equaling the frequency of the clock signals times the number of clock signals. Since the frequency of the clock signals is smaller than the virtual frequency, the method according to the invention will likely result in saving power. One will easily understand that the method is equally applicable to the device according to the invention.

These and other aspects of the invention are apparent from and will be elucidated by way of non-limiting examples described hereinafter.

DESCRIPTION OF EMBODIMENTS

Figure 1:
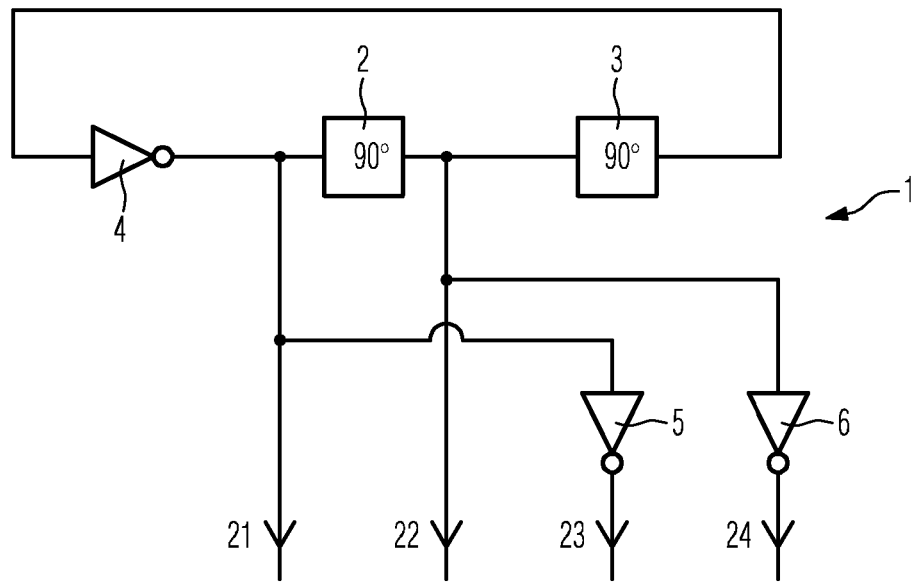
FIG. 1 shows a first embodiment of a clock generator.
Figure 2:
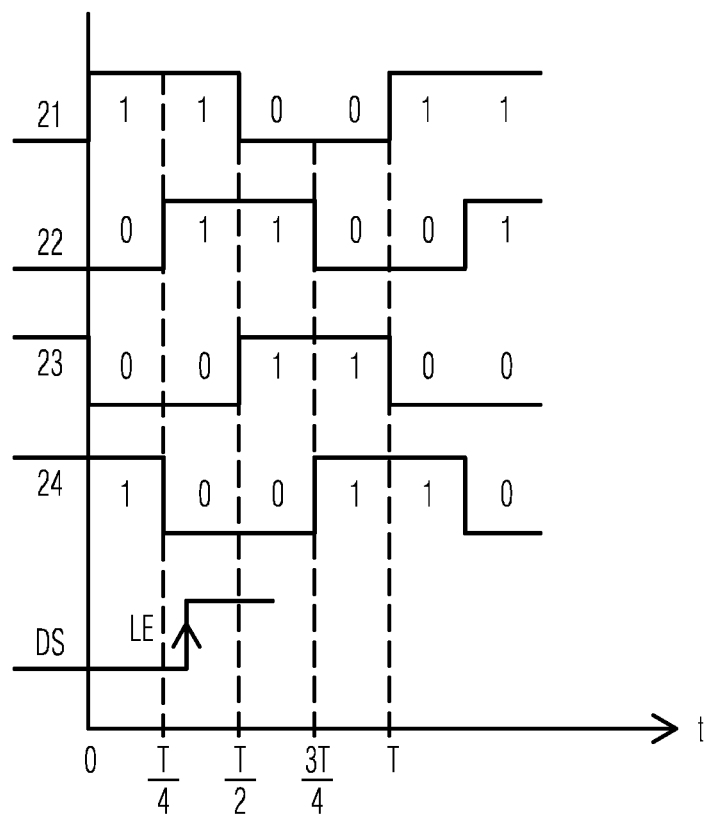
FIG. 2 shows clock signals obtained by the clock generator of FIG. 1.

A first embodiment of a clock generator in the form of a ring oscillator 1 is shown in FIG. 1. The ring oscillator 1 generates a first clock signal 21, a second clock signal 22, a third clock signal 23, and a fourth clock signal 24. The four clock signals 21-24 depicted in FIG. 2 are pulsed signals and have the same cycle duration T and the same fundamental frequency, respectively. The ring oscillator 1 comprises a first delay element 2, a second delay element 3, a first inverter 4, a second inverter 5, and a third inverter 6. The first clock signal 21 is present at the output of the first inverter 4, which is connected to the input of the first delay element 2. The first delay element 2 delays the first clock signal 21 by a constant time period T/4, corresponding to a phase shift of 90°. The second clock signal 22 is present at the output of the first delay element 2. The second delay element 3, which is connected downstream to the first delay element 2, delays the second clock signal 22 by the constant time period T/4, corresponding to another phase shift of 90°. The output of the second delay element 3 is connected to the input of the first inverter 4, closing the loop of the ring oscillator 1.

The second inverter 5 is connected downstream to the output of the first inverter 4 and generates the third clock signal 23 by inverting the first clock signal 21. The third inverter 6 is connected downstream to the output of the first delay element 2 and generates the fourth clock signal 24 by inverting the second clock signal 22.

Although the ring oscillator 1 obviously requires power to operate, an appropriate power supply providing an appropriate supply voltage is not shown in the Figures for the sake of brevity. However, the ring oscillator 1 begins to oscillate spontaneously above a certain threshold of the supply voltage.

FIG. 2 shows the four clock signals 21-24. At time t=0, the first clock signal 21, changes its value from zero to a positive voltage value corresponding to the state "1". The state "1" of the first clock signal 21 lasts up to t=T/2, when the first clock signal 21 changes its state to "0". Thus, the first clock signal 21 has a rising edge at t=0 and a falling edge at t=T/2. T is the cycle duration of the clock signals 21-24. The second clock signal 22 lags the first clock signal 21 by T/4. Therefore, the second clock 22 signal has the state "0" at t=0, changes its state to "1" at t=T/4 and falls back to the state "0" at t=3 T/4. Thus, the second clock signal 22 has a rising edge at t=T/4 and a falling edge at t=3 T/4. The third clock signal 23 lags the second clock signal 22 by T/4. Therefore, the third clock 23 signal changes its state to "1" at t=T/2 and falls back to the state "0" at t=T. Thus, the third clock signal 23 has a rising edge at t=T/2 and a falling edge at t=T. The fourth clock signal 24 lags the third clock signal 23 by T/4. Therefore, the fourth clock 24 signal has the state "1" at t=0 and changes its state to "0" at t=T/4 and to "1" at t=3 T/4. Thus, the fourth clock signal 24 has a rising edge at t=3 T/4 and a falling edge at t=T/4. As a result, the ring oscillator 1 of FIG. 1 provides four clock signals 21-24, each having a cycle duration T (or a frequency 1/T) and each being phase-shifted 90° with respect to each other (or time-shifted by T/4).

Figure 3:
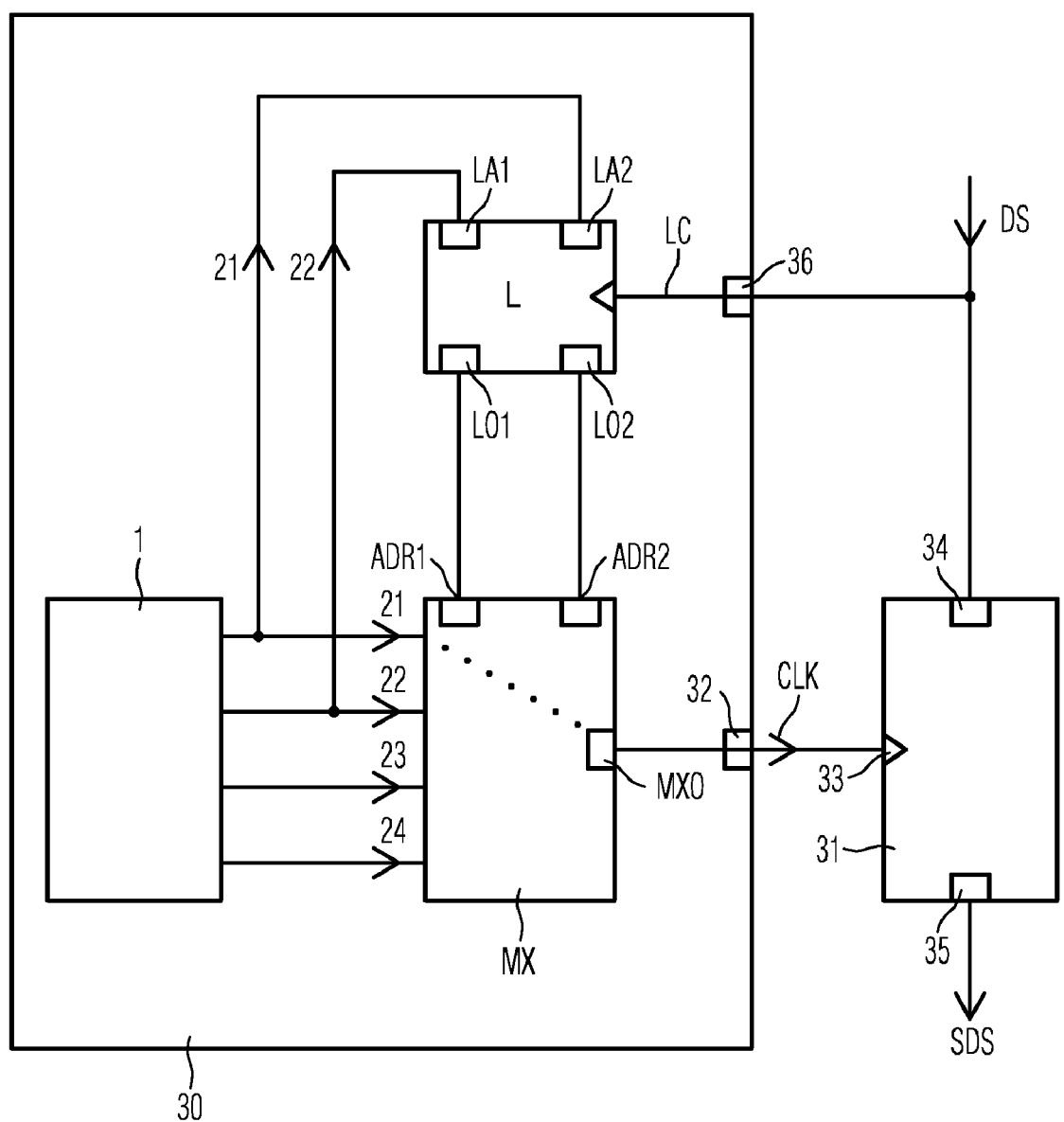
FIG. 3 is an embodiment of an electric circuit according to the invention.

FIG. 3 shows an electric circuit 30 comprising the ring oscillator 1 of FIG. 1 as a clock generator, a 4-to-1 multiplexer MX, whose input signals are the four clock signals 21-24, and a latch circuit L. The multiplexer MX has a first address input ADR1 and a second address input ADR2, each of which can have the state "0" or "1". Depending on the states present at the address inputs ADR1, ADR2, one of the four clock signals 21-24 is present at an output MXO of the multiplexer MX. The output signal present at the multiplexer output MXO is also the output signal of the electric circuit 30, which signal is present at an output 32 of this circuit 30 and is a clock-sampling signal CLK for a sampling device 31.

The clock-sampling signal CLK is fed to a clock input 33 of the sampling device 31. The sampling device 31 is used to sample a digital signal DS, which is fed to an input 34 of the sampling device 31. The sampled digital signal SDS is present at an output 35 of the sampling device 31.

The latch circuit L has a clock input LC, which is connected to an input 36 of the electric circuit 30. The digital signal DS is fed to the input 36 of the electric circuit 30 and thus to the clock input LC of the latch circuit L. The latch circuit L comprises a first output LO1, which is connected to the first address input ADR1 of the multiplexer MX, and a second output LO2, which is connected to the second address input ADR2 of the multiplexer MX. Each latch output LO1, LO2 can have the state "0" or "1".

The multiplexer MX is configured in such a way that the first clock signal 21 is the clock-sampling signal CLK if the first address input ADR1 has the state "0" and the second address input ADR2 has the state "0". If the first address input ADR1 has the state "1" and the second address input ADR2 has the state "0", the clock-sampling signal CLK is the second clock signal 22. If the first address input ADR1 has the state "1" and the second address input ADR2 has the state "1", the clock-sampling signal CLK is the third clock signal 23. Finally, if the first address input ADR1 has the state "0" and the second address input ADR2 has the state "1", the clock-sampling signal CLK is the fourth clock signal 24.

The latch circuit L has a first address input LA1 and a second address input LA2. The states of the latch address inputs LA1, LA2 depend on the values of the first clock signal 21 and the second clock signal 22 at a given point in time. If the first clock signal 21 has a value corresponding to the logic value "0", the state of the first latch address input LO1 is "0", and if the first clock 21 signal has a value corresponding to the logic value "1", the state of the first latch address input LA1 is "1". The same applies to the second latch address input LA2 which depends on the second clock signal 22.

The states of the latch outputs LO1, LO2 correspond to the states of the latch address inputs LA1, LA2 as long as the clock input LC is "0".

The latch circuit L is further configured to detect a rising edge LE of a signal fed to its clock input 33 in this embodiment. Since the digital signal DS is fed to the clock input 33 of the latch circuit L, the latch circuit L detects an incoming digital signal DS as soon as it comprises a rising edge LE, i.e. it detects the first rising edge LE of a received digital signal DS. The latch circuit L is further configured to store the current states of the latch outputs LO1, LO2 at the moment when the latch circuit L detects the rising edge LE of the digital signal DS. From that point in time, the states of the multiplexer address inputs ADR1, ADR2 are fixed and the clock-sampling signal CLK for the sampling device 31 is selected. It should be noted that storing a value by a latch circuit L is only one possible embodiment. One skilled in the art can easily perceive that other methods are applicable as well. Examples are a latch, which is clocked on a falling edge of the clock input LC, as well as any other register or memory circuit.

It should further be noted that, although the digital signal DS is hard-wired with the clock input LC of the latch circuit L in FIG. 3, there could also be means for cutting off the connection after the very first characteristic section of the digital signal DS, in this case after the first rising edge LE so that the latched value remains stable, even if the digital signal comprises further rising edges. A simple example is an electronic switch between the latch circuit L and the input 36, which switch opens after an initial sequence, e.g. when a transponder comprising an electric circuit 30 according to the invention enters the electromagnetic field of a reader station (strictly speaking, when the reader station transmits an initial sequence of radio signals). However, the switch may be closed again, e.g. when another synchronization is requested.

FIG. 2 shows an example of a digital signal DS with a rising edge LE. At the point in time of the rising edge LE, the states of the latch address inputs LA1, LA2 are, "1 1". Therefore, the third clock signal 23 is used as the sampling clock CLK for the sampling device 31. The third clock signal 23 is that clock signal which has the first rising edge immediately after the rising edge LE of the digital signal DS.

Figure 4:
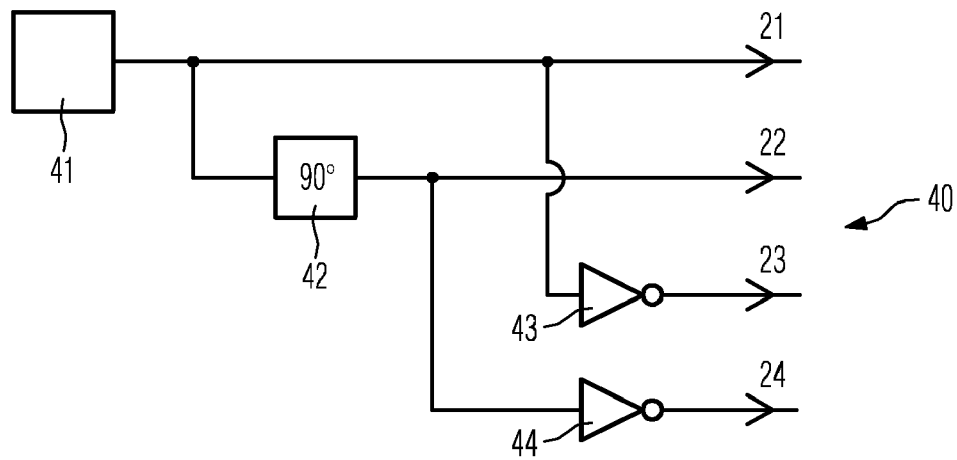
FIGS. 4 to 6 show further embodiments of clock generators.

The electric circuit 30 of FIG. 3 comprises a clock generator, which generates four clock signals 21-24. However, the electric circuit according to the invention is not limited to four clock signals. Furthermore, the electric circuit 30 comprises the ring oscillator 1 as a clock generator. Other types of clock generators are also feasible. FIG. 4 shows a second embodiment of a clock generator 40 producing the clock signals 21-24. The clock generator 40 can be used for the electric circuit 30.

The clock generator 40 of FIG. 4 comprises an oscillator 41, which may be, for example, a quartz oscillator, one delay element 42, a first inverter 43, and a second inverter 44. The oscillator 41 outputs a base clock signal, which is the first clock signal 21 in this embodiment. The delay element 42 is connected downstream to the oscillator 41 and delays the first clock signal 21 by a time period of T/4, corresponding to a phase shift of 90°. The output signal of the delay element 42 is the second clock signal 22. The first inverter 43 is also connected downstream to the oscillator 42 and inverts the first clock signal 21. Accordingly, the output signal of the first inverter 43 is the third clock signal 23. The second inverter 44 is connected downstream to the delay element 42 and inverts the second clock signal 22. Accordingly, the output signal of the delay element 42 is the fourth clock signal 24.

Although the clock generator 40 obviously requires power to operate, an appropriate power supply providing an appropriate supply voltage is not shown in the Figures for the sake of brevity.

Figure 5:
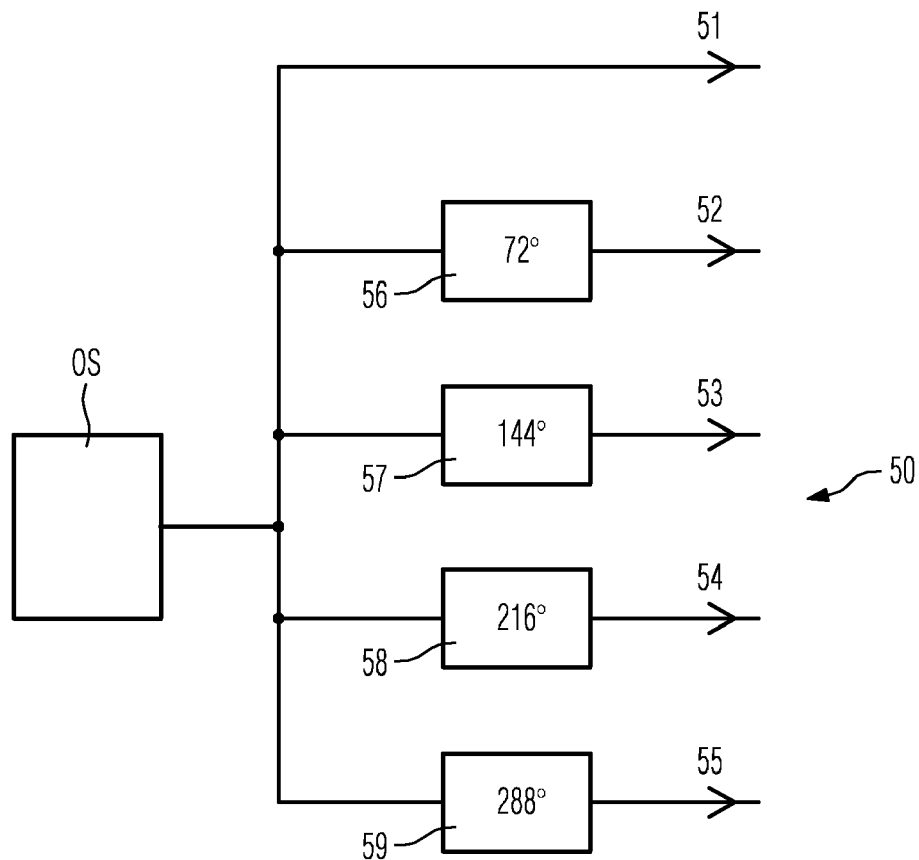

FIG. 5 shows an example of a clock generator 50, which does not provide four, but five clock signals 51-55 in this embodiment. Thus, if used for the electric circuit 30 of FIG. 3, the multiplexer MX must be replaced by a 5-to-1 multiplexer. Each of the five clock signals 51-55 is phase-shifted 72° with respect to the preceding and succeeding clock signals.

The clock generator 50 comprises an oscillator OS, which may be a quartz oscillator again (however, any other oscillator is applicable as well), a first delay element 56, a second delay element 57, a third delay element 58, and a fourth delay element 59. The oscillator OS outputs a base clock signal, which is the first clock signal 51 generated by the clock generator 50.

The four delay elements 56-59 are each connected downstream to the oscillator OS. The first delay element 56 delays the first clock signal 51 by a time period of T/5 (equivalent to a phase shift of 72°), generating the second clock signal 52. The second delay element 57 delays the first clock signal 51 by a time period of 2 T/5 (144°), generating the third clock signal 53. The third delay element 58 delays the first clock signal 51 by a time period of 3 T/5 (214°), generating the fourth clock signal 54, and the fourth delay element 59 delays the first clock signal 51 by a time period of 4 T/5 (288°), generating the fifth clock signal 55.

Although the clock generator 50 obviously requires power to operate, an appropriate power supply providing an appropriate supply voltage is not shown in the Figures for the sake of brevity.

The ring oscillator 1 and the clock generators 40, 50 each generate a plurality of clock signals 21-24, 51-55, each having the same cycle duration T and the same phase shift with respect to the preceding and succeeding clock signals.

Figure 6:
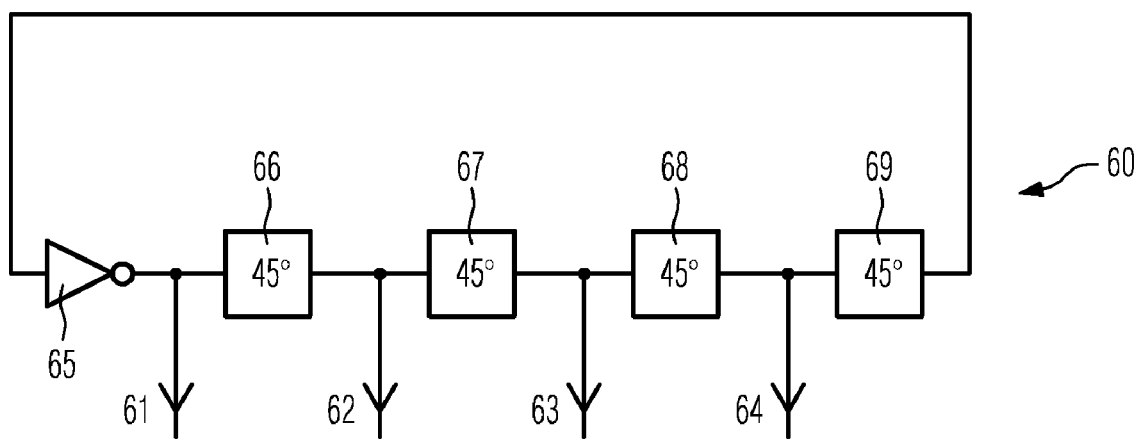

FIG. 6 shows an embodiment of a clock generator in the form of a ring oscillator 60 which can also be used for the electric circuit 30 of FIG. 3. However, the ring oscillator 60 generates four clock signals 61-64, each having the same cycle duration, but not lagging the preceding clock signal by the same time period.

In this embodiment, the ring oscillator 60 comprises an inverter 65, a first delay element 66, a second delay element 67, a third delay element 68, and a fourth delay element 69. The output of the inverter 65 is connected to the input of the first delay element 66, the output of the first delay element 66 is connected to the input of the second delay element 67, the output of the third delay element 68 is connected to the input of the fourth delay element 69, and the output of the fourth delay element 69 is connected to the input of the inverter 65, closing the ring oscillator 6. Each delay element 66-69 delays an input signal by a constant time period which corresponds to a phase shift of 45° of a plurality of clock signals generated by the ring oscillator 60. Accordingly, there is a phase shift of 45° between the first and the second clock signal 61 and 62, between the second and the third clock signal 62 and 63, between the third and the fourth clock signal 63 and 64, and a phase shift of 225° between the fourth and the (succeeding) first clock signal 64 and 61. One can easily see that the rising and falling edges of the clock signals 61-64 are not evenly distributed over time. However, the invention is also applicable to such embodiments of a clock generator.

Although the ring oscillator 60 requires power to operate, an appropriate power supply providing an appropriate supply voltage is not shown in the Figures for the sake of brevity. However, the ring oscillator 60 begins to oscillate spontaneously above a certain threshold voltage.

It should be noted that all clock signals in the afore-mentioned examples have a duty cycle of 50%, which means that the time periods during which a clock signal is "0" or "1" are equal. However, this measure is not mandatory for the invention. One skilled in the art will easily perceive that the invention also works well with clock signals having a different duty cycle.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. Use of the verb "comprise" and its conjugations does not exclude the presence of elements or steps other than those stated in any claim or the specification as a whole. The singular reference of an element does not exclude the plural reference of such elements, and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electric circuit for generating a clock signal for a sampling device, the electric circuit comprising:
   a clock generator for generating a plurality of clock signals, each having the same cycle duration and being phase-shifted with respect to each other,
   a correlation device for correlating a characteristic signal section (LE) of a digital signal with said plurality of clock signals,
   a selecting device for selecting one of said clock signals as a clock-sampling for a sampling device to sample said digital signal on the basis of said correlation by said correlation device.

2. The device of claim 1, wherein said characteristic signal section of said digital signal is one of a rising edge, a falling edge, a minimum or a maximum of said digital signal.

3. The device of claim 1, wherein each of said clock signals has a characteristic section, and said correlation device determines a time difference or a phase difference between at least one of said characteristic sections and said characteristic signal section of said digital signal.

4. The device of claim 3, wherein said characteristic section is one of a rising edge or a falling edge of the corresponding one of said clock signals.

5. The device of claim 3, wherein said selecting device selects as said clock-sampling signal the clock signal from said plurality of clock signals with the smallest time difference or phase difference determined by said correlation device.

6. The device of claim 1, wherein said clock generator comprises an oscillator providing a base clock signal, and a signal-processing device for generating said plurality of clock signals on the basis of said base clock signal.

7. The device of claim 1, wherein said clock generator comprises a ring oscillator with at least one time-delay device.

8. A method of selecting a clock signal from a plurality of clock signals, the method comprising the steps of:
   generating a plurality of clock signals, each having the same cycle duration and being phase-shifted with respect to each other;
   correlating a characteristic signal section of a digital signal with said clock signals; and
   selecting, from said plurality of clock signals, a clock-sampling signal for a sampling device for sampling said digital signal on the basis of said correlation.

9. The method of claim 8, comprising the steps of comparing, for each of said clock signals, a time difference or a phase difference between said characteristic signal section with a characteristic section of said clock signals as said correlation step, and selecting, as said clock-sampling signal, the clock signal from said plurality of clock signals with the smallest time difference or phase difference of said time differences or phase differences as said selecting step.

10. A method of choosing a clock signal from a plurality of clock signals, the method comprising the steps of:
    generating a plurality of clock signals; each of said signals having the same cycle durations, being phase-shifted with respect to each other, and having a rising and a falling edge; and
    choosing, from said plurality of clock signals, the clock signal whose rising or falling edge immediately follows a characteristic signal section of a digital signal as a clock-sampling signal for a sampling device for sampling said digital signal.

* * * * *